(12) United States Patent
Seshadri et al.

(10) Patent No.: US 11,715,022 B2
(45) Date of Patent: Aug. 1, 2023

(54) MANAGING THE SELECTION AND PRESENTATION SEQUENCE OF VISUAL ELEMENTS

(71) Applicant: International Business Machines Corporation, Armonk, NY (US)

(72) Inventors: Padmanabha Venkatagiri Seshadri, Mysore (IN); Nupur Aggarwal, Bangalore (IN); Sumanta Mukherjee, Bangalore (IN); Satyam Dwivedi, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 355 days.

(21) Appl. No.: 16/918,040

(22) Filed: Jul. 1, 2020

(65) Prior Publication Data
US 2022/0004894 A1   Jan. 6, 2022

(51) Int. Cl.
*G06N 5/04*  (2023.01)
*G06N 20/00*  (2019.01)
*G06T 11/00*  (2006.01)

(52) U.S. Cl.
CPC .............. *G06N 5/04* (2013.01); *G06N 20/00* (2019.01); *G06T 11/00* (2013.01)

(58) Field of Classification Search
CPC ........ G06N 5/04; G06N 20/00; G06N 3/0445; G06N 3/0454; G06N 3/08; G06N 5/022; G06T 11/00
See application file for complete search history.

(56) References Cited

U.S. PATENT DOCUMENTS

| | | | |
|---|---|---|---|
| 6,785,672 B1* | 8/2004 | Floratos | G06F 18/28 707/999.1 |
| 6,816,847 B1 | 11/2004 | Toyama | |
| 9,070,171 B2 | 6/2015 | Guo | |
| 10,275,819 B1* | 4/2019 | Johnson | G06N 5/022 |
| 11,200,075 B2* | 12/2021 | Jung | G06N 20/00 |
| 2012/0123975 A1* | 5/2012 | Lin | G06F 9/453 706/11 |
| 2013/0215116 A1* | 8/2013 | Siddique | G06Q 20/40 705/26.7 |
| 2015/0100455 A1 | 4/2015 | Kitou | |
| 2017/0352091 A1* | 12/2017 | Chen | G06F 3/04845 |

(Continued)

OTHER PUBLICATIONS

Bradford et al., "An Application of Arlilicial Intelligence to the Choreography of Dance", Computers and the Humanities, Aug. 1995, pp. 233-240, vol. 29 Issue 4, <https://www.jstor.org/stable/30204501?seq=1>.

(Continued)

*Primary Examiner* — Michael Le
(74) *Attorney, Agent, or Firm* — David K. Mattheis (57) ABSTRACT

A method for managing the composition and presentation sequencing of compound visual elements, the method including generating a graph of all possible compound visual element combinations, generating a set of possible visual element presentation sequences according to a depth-first search (DFS) of the graph, generating a score for each member of the set of possible visual element presentation sequences according to visual element attributes, and enumerating a visual element presentation sequence according to a visual element presentation sequence score.

20 Claims, 7 Drawing Sheets

(56) References Cited

U.S. PATENT DOCUMENTS

| | | | |
|---|---|---|---|
| 2019/0318405 A1* | 10/2019 | Hu | G06V 20/00 |
| 2021/0035187 A1* | 2/2021 | Ning | G06Q 30/0631 |
| 2021/0326393 A1* | 10/2021 | Aggarwal | G06F 18/24147 |

OTHER PUBLICATIONS

Carlson et al., "Scuddle: Generating Movement Catalysts for Computer-Aided Choreography", Proceedings of the Second International Conference on Computational Creativity, downloaded from the internet on Feb. 11, 2020, pp. 123-128, <https://pdfs.semanticscholar.org/b3f3/43c5c489c3285416675a35b21eea958de19c.pdf>.

Chan et al., "Everybody Dance Now", arXiv:1808 07371 v2 [cs GR], Aug. 27, 2019,12 pages, <https://arxiv.org/pdf/1808.07371.pdf>.

Crnkovic-Friis et al., "Generative Choreography using Deep Learning", 7th International Conference on Computational Creativity, downloaded from the internet on Feb. 11, 2020, 6 pages, <https://arxiv.org/ftp/arxiv/papers/1605/1605.06921.pdf>.

Donahue et al., "Dance Dance Convolution", arXiv:1703.06891v3 [cs.LG], Jun. 21, 2017, 10 pages, <Khttps://arxiv.org/abs/1703.06891>.

Leprince-Ringuet, Daphne, "Google's latest experiment teaches AI to dance like a human", Wired, Dec. 17, 2018, 24 pages, <https://www.wired.co.uk/article/google-ai-wayne-mcgregor-dance-choreography>.

Mell et al., "The NIST Definition of Cloud Computing", Recommendations of the National Institute of Standards and Technology, Special Publication 800-145, Sep. 2011, 7 pages.

Ofli et al., "Learn2Dance: Learning Statistical Music-to-Dance Mappings for Choreography Synthesis", IEEE Transactions on Multimedia, Jun. 2012, 13 pages, vol. 14 Issue 3, <https://ieeexplore.ieee.org/abstract/document/6112231>.

Soo Hoo, Fawnia, "What a runway show really costs", Vogue Business, Feb. 5, 2019, 9 pages, <https://www.voguebusiness.com/companies/cost-of-runway-show-christian-siriano-discount-universe>.

Yildirim et al., "Generating High-Resolution Fashion Model Images Wearing Custom Outfits", arXiv: 1908.08847v1 [cs.CV], Aug. 23, 2019, 5 pages, <https://www.researchgate.net/profile/Urs_Bergmann/publication/335395504_Generating_High-Resolution_Fashion_Model_Images_Wearing_Custom_Outfits/links/5d70ee7492851cacdb21b230/Generating-High-Resolution-Fashion-Model-Images-Wearing-Custom-Oulfils.pdf>.

* cited by examiner

MANAGING THE SELECTION AND PRESENTATION SEQUENCE OF VISUAL ELEMENTS

BACKGROUND

The disclosure relates generally to managing the composition and associated presentation sequence of visual elements. The disclosure relates particularly to determining the composition of presentation model/visual design pairings and other dimensions of an associated pairing presentation sequence.

The overall impact of a visual element may be enhanced or diminished according to the specific composition of a compound element and other dimensions associated with the presentation of the element. The sequence of presentation for a set of visual elements affects the impact of any single element among the set.

SUMMARY

The following presents a summary to provide a basic understanding of one or more embodiments of the disclosure. This summary is not intended to identify key or critical elements or delineate any scope of the particular embodiments or any scope of the claims. Its sole purpose is to present concepts in a simplified form as a prelude to the more detailed description that is presented later. In one or more embodiments described herein, devices, systems, computer-implemented methods, apparatuses and/or computer program products enable composing and sequencing compound visual elements for sequential presentation.

Aspects of the invention disclose methods, systems and computer readable media associated with improving the sequencing of compound visual element presentations by generating a graph of all possible compound visual element combinations, generating a set of possible visual element presentation sequences according to a depth-first search (DFS) of the graph, generating a score for each member of the set of possible visual element presentation sequences according to visual element attributes, and enumerating a visual element presentation sequence according to a visual element presentation sequence score.

Aspects of the invention disclose methods, systems and computer readable media associated with improving the sequencing of compound visual element presentations by training a first artificial intelligence model to rank and optimize visual design/presentation model pairings according to visual design/presentation model attribute data, training a second AI model to score visual design/presentation model pairings presentation sequences according to historic presentation sequence data, generating a graph of all possible visual design/presentation model combinations, generating a set of possible visual design/presentation model presentation sequences according to a depth-first search (DFS) of the graph, generating a score for each member of the set of possible visual design/presentation model presentation sequences according to the first AI model and visual design/presentation model attributes, and enumerating a visual design/presentation model presentation sequence according to a visual design/presentation model presentation sequence score determined by the second AI model.

Aspects of the invention disclose methods, systems and computer readable media associated with improving the sequencing of compound visual element presentations by training a first artificial intelligence model to rank and optimize visual element pairings according to visual element attribute data, training a second AI model to score visual element pairings presentation sequences according to historic presentation sequence data, generating a graph of all possible visual element combinations, generating a set of possible visual element presentation sequences according to a depth-first search (DFS) of the graph, generating a score for each member of the set of possible visual element presentation sequences according to the first AI model and visual element attributes, and enumerating a visual element presentation sequence according to a visual element presentation sequence score determined by the second AI model.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

In an embodiment, one or more components of the system can employ hardware and/or software to solve problems that are highly technical in nature (e.g., training machine learning models, selecting compound visual element component pairings according to a machine learning model, creating a listing of possible compound visual element combinations, determining all possible presentation sequences for the compound visual elements, and scoring the possible presentation sequences according to a machine learning model trained using historical sequence ranking data, etc.). These solutions are not abstract and cannot be performed as a set of mental acts by a human due to the processing capabilities needed to facilitate endpoint device remediation, for example. Further, some of the processes performed may be performed by a specialized computer for carrying out defined tasks related to memory operations. For example, a specialized computer can be employed to carry out tasks related to determining and scoring possible presentation sequences according to a machine learning model, or the like.

The sequence in which a set of visual elements are presented to an audience may affect the impact the set of elements has upon the audience. The choreographing of the presentation of fashion designs, to an audience during a fashion show runway walk, typically depends upon the artistic skills of a choreographer. The time-consuming trial-and-error process of organizing model/design pairings and presentation sequencing depends upon intuition and a limited knowledge of what works and what does not. Disclosed methods provide artificial intelligence (AI) assisted presentation organizers to identify best-case model/design combinations. The disclosed methods determine the combinations for sets of presentation model and design inputs using AI models trained upon historical data related to presentation model and design attributes. The disclosed methods then determine an optimal presentation sequence for the selected combinations. The disclosed methods sequence the combinations to achieve the highest presentation sequence impact, while also considering design collection themes and designer priorities, using a second AI model trained using historical data associated with presentation-impact scores.

Throughout the following description, presentation model refers to an entity chosen to present a particular design. The presentation models include human and/or animals selected to present designs. The presentation models include real and virtual entities. Applications of the disclosed methods and systems include pairing of sets of visual components, such as presentation models and designs, video content such as motion pictures and documentaries combined with video commercials, as well as combining dancers with choreographed dance roles and sequencing the dancer/role pairings with lighting and background music.

In the description, an AI model refers to a computational system trained to assist in choreographing a design presentation sequence. The AI models include artificial intelligence systems including regression models for identifying optimal pairings of presentation models and fashion designs, depth-first search enabling analysis of graphs of possible presentation model/design compound visual elements, and AI models to score and rank identified possible presentation sequences of optimal pairings of models and designs.

As used herein, a compound visual element refers to a visual element including two or more sub-elements. Compound visual elements include presentation model/fashion design pairing, as well as combinations of objects and paired scenery around the objects.

As used herein, a depth-first search refers to a method for analyzing a model or graph of data. In an embodiment, a node-edge model of possible presentation model/fashion design pairings, where pairing constitute nodes and pairing presentation sequence ordering constitute edges between nodes. The depth-first search proceeds from a first node along branches of the model to identify all possible presentation sequences. An initial constraint prohibits presentation sequence edges between nodes having the same presentation model. (In an embodiment, application of additional constraints reduces the number of possible presentation sequences.)

In the following description, the methods of the disclosed inventions are described using the example of presentation model/design pairings. The use of this example should not be construed as limiting the scope of the invention. The disclosed methods apply to defining the composition and sequencing of any set of potential compound visual elements for presentation.

Figure 1:
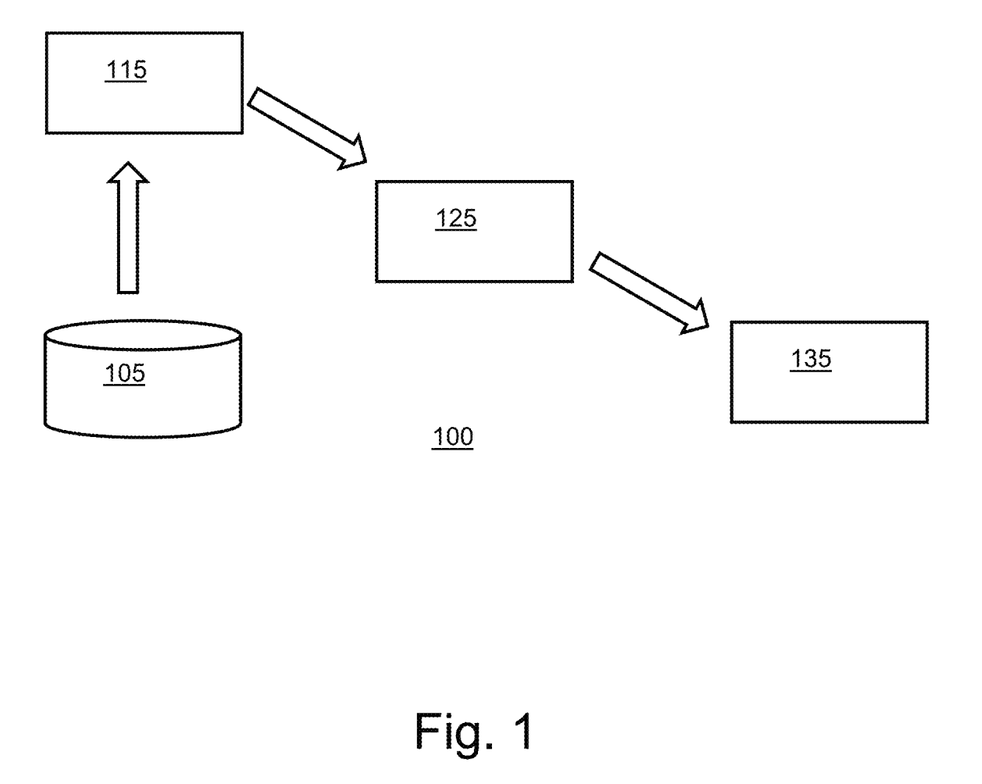
FIG. 1 provides a flowchart depicting an operational sequence, according to an embodiment of the invention.

In an embodiment, illustrated in flowchart 100 of FIG. 1, an artificial intelligence (AI) pairing model 115 defines the set of best or optimal pairings between presentation models and fashion designs according to input data 105. (Input data 105 relates to the respective relevant presentation models and fashion designs. At block 125, the method generates a graph of presentation model/fashion design pairings from AI pairing model 115. In the graph, each pairing constitutes a node. Edges between nodes represent possible pairing sequences. At block 135, a depth-first search (DFS) of the block 125 graph yields a set of all possible pairing sequences scored using a second AI model trained to score pairing sequences according to historic pairing sequence reviews.

In one embodiment, training the AI model includes a regression model using defined presentation model and fashion design attributes. Presentation model attributes include height, average walking gait length, and other physical feature descriptions, etc., available from sources such as model directories, while fashion design attributes include type of design, fabric, colors, design motivation, and occasion, etc., provided by a designer's manual describing of the design collection. In an embodiment, training the AI model includes using presentation model images and social media likes/dislikes associated with the images. In an embodiment, training the AI model includes sentiment scoring or other natural language processing (NLP) of detailed descriptions of presentation models, fashion designs as well as previous presentation model/fashion design pairing—including critical ranking and commentary, both positive and negative. In an embodiment, training the AI model includes defining presentation model/fashion design pairing scoring according to fashion expert input. In this embodiment, the expert input relates to individual presentation models and fashion designs in terms of presentation model and fashion design attributes. Consideration may also be taken of expert input regarding previous presentation model/fashion design pairings.

Figure 2:
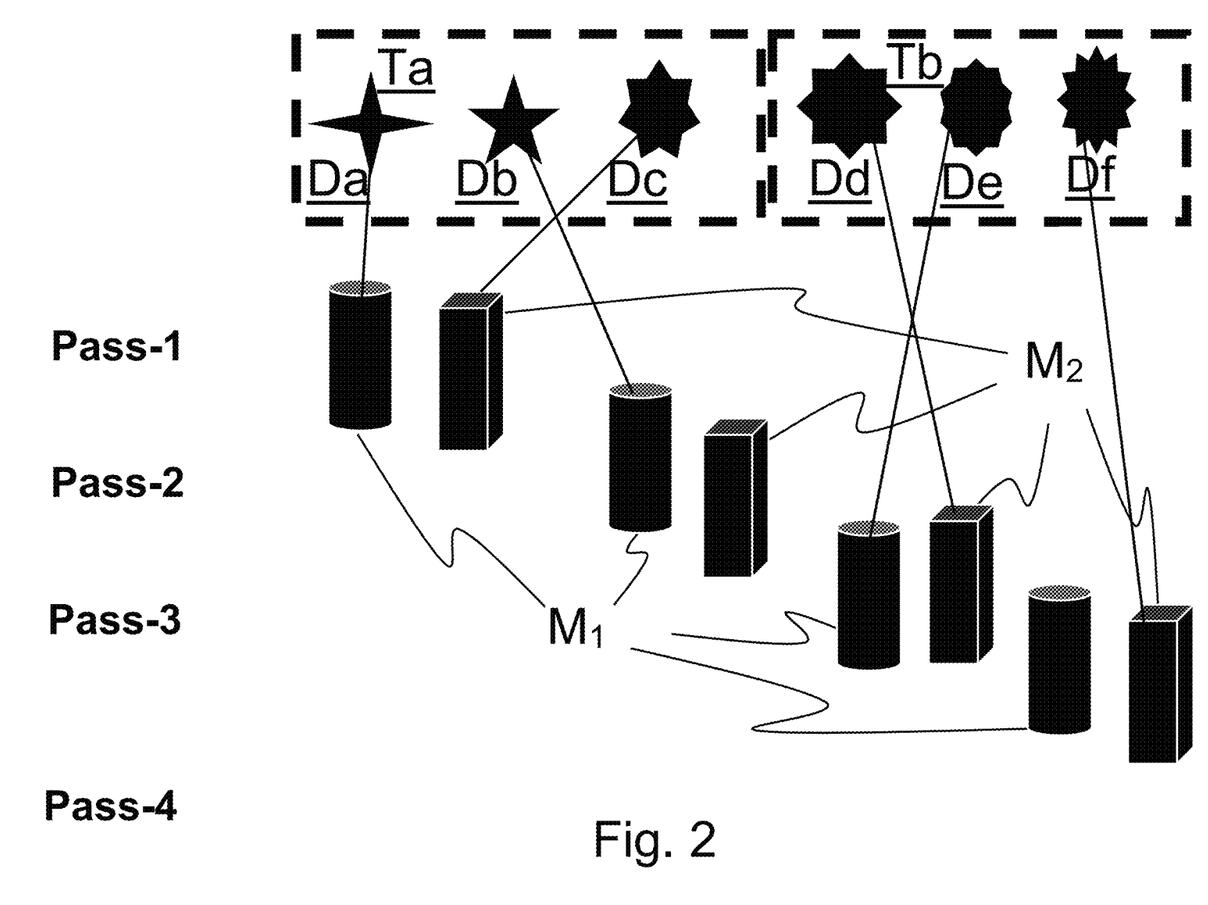
FIG. 2 provides a schematic illustration of pairing process iterations, according to an embodiment of the invention.

FIG. 2 illustrates exemplary activities associated with the practice of the disclosure. After training, the AI pairing model, the system receives input information regarding the sets of presentation model and fashion designs to be paired for the upcoming fashion walk (presentation sequence). As shown in FIG. 2, a design collection includes two themes, Ta, and Tb. The AI model must pair two models, $M_1$, and $M_2$, with the three designs of each of the two themes of the collection (e.g., Da-Dc of Ta and Dd-Df of Tb). Each possible pairing $M_1$-Da, $M_2$-Da, etc., carries a weighted score according to the trained pairing AI model based upon the specifics of the pairing AI model structure and training data set. In an embodiment, for each design, the pairing AI model selects the model pairing having the highest score. In an embodiment, for each model the pairing AI model selects the design pairing having then highest score. As shown in FIG. 2, iterative passes 1-4. by the pairing AI model results in a set of model/designs having the optimal scoring according to the pairing AI model.

In an embodiment, the method overcomes a problem of rolling assignments in making the pairings. Each pairing assignment must account for all previous assignments according to the constraints upon the sequencing. For example, a single model cannot be paired with every design for a presentation sequence. Each iterative pass considers the pairings made in all previous passes to provide a balanced distribution of models and designs. As shown in the figure, pass 1 pairs $M_1$ and Da, as well as $M_2$ and Dc. Pass 2 pairs $M_1$ and Db completing pairings for theme Ta. Pass 3 pairs $M_1$ and De as well as $M_2$ and Dd. Pass 4 completes theme Tb by pairing $M_2$ with Df.

In an embodiment, the designer, walk choreographer or other person, can override the AI pairing model output and specify particular presentation model/fashion design pairings for the walk. In an embodiment, where a designer has overridden the AI pairing model by specifying a specific presentation model for one or more fashion designs, all remaining presentation model and fashion design selections are processed by the AI pairing model. In this embodiment, the AI pairing model output includes pairings combining presentation models and fashion designs for all the designs for which the designer has not specified a presentation model.

Figure 3:
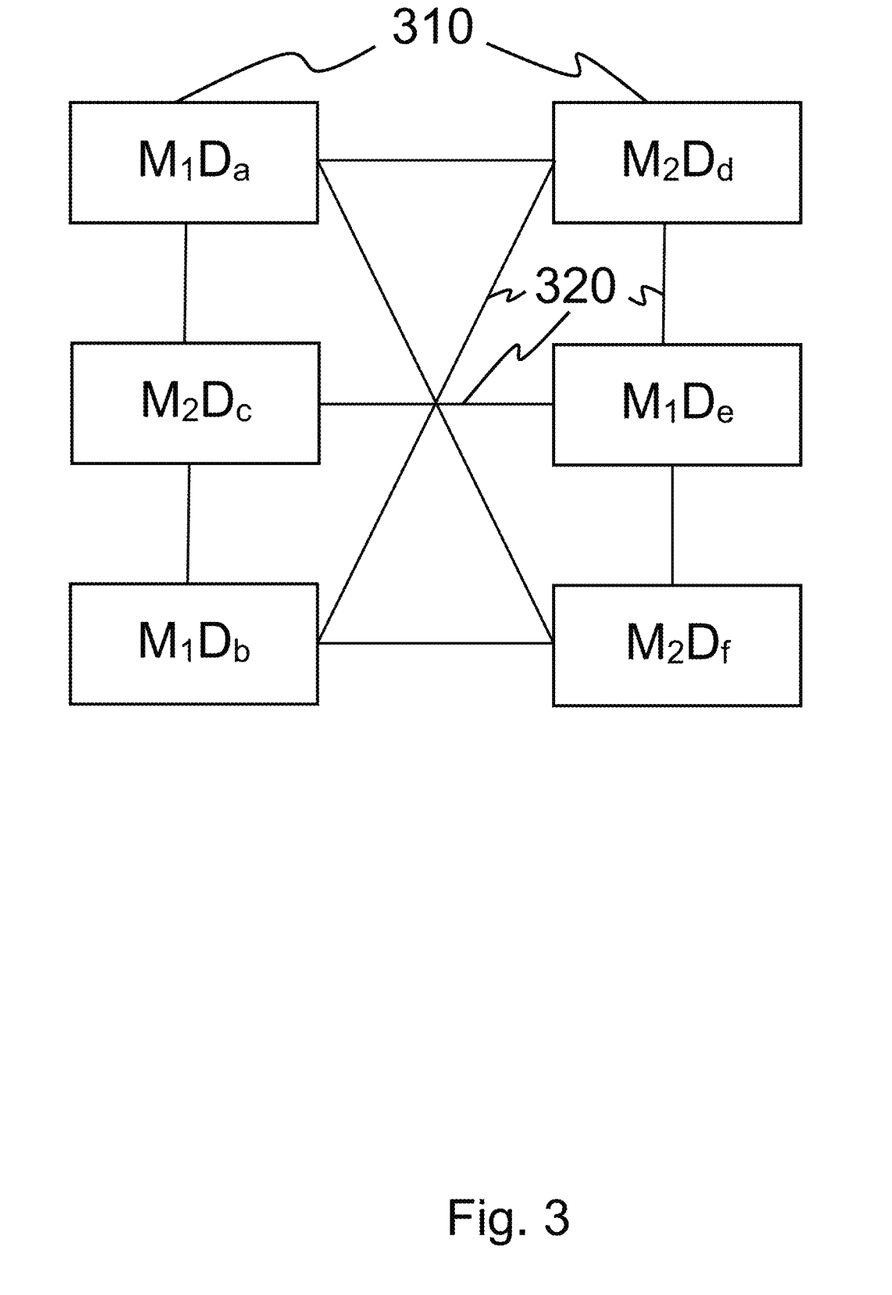
FIG. 3 provides a schematic illustration of a pairing node-edge graph, according to an embodiment of the invention.

After defining a final set of pairings, the method creates a node-edge graph of the set of pairings. As shown in FIG. 3, each node 310 represents a different pairing. Each edge 320 connects a sequence of nodes (pairings). In an embodiment, method sequencing constraints prohibit edges between two nodes having the same presentation model to provide time for models to change from one fashion design to the next.

A DFS of the graph generates a set of feasible walk sequences. In an embodiment, the DFS iteratively forms a set of walk sequence stacks including the nodes and edges of the particular walk sequence. In an embodiment, the method follows a modified DFS protocol. In conducting the DFS for each stack, each node and edge initializes as white, changing from white to black upon inclusion in the current DFS walk sequence stack. Black nodes/edges within the stack are not considered further for inclusion in the current stack. As the DFS progresses for each stack, nodes and associated edges may be ejected outside the current stack. Upon ejection, nodes and edges revert from black to white, enabling their consideration for future inclusion once again, in the current stack.

In an embodiment, method constraints are applied as DFS walk sequence stacks are formed. The method applies constraints related to presentation models, fashion designs or combinations thereof, constraints regarding sequences—all of theme 1 then all of theme 2, theme 1 prior to theme 2, etc., as the DFS stack forms. Prior to the addition of any node the forming stack, a decision maker of the method applies all known constraints to the proposed stack including the additional node. The addition of the node to the stack proceeds only when all constraints validate as true or satisfied.

Table 1 illustrates the feasible presentation sequences from the graph of FIG. 3.

TABLE 1

| 1 | (M1, Da) > (M2, Dc) > (M1, Db) > (M2, Dd) > (M1, De) > (M2, Df) |
| 2 | (M1, Da) > (M2, Dc) > (M1, Db) > (M2, Df) > (M1, De) > (M2, Dd) |
| 3 | (M1, Db) > (M2, Dc) > (M1, Da) > (M2, Df) > (M1, $D_e$) > (M2, Dd) |
| 4 | (M1, Db) > (M2, Dc) > (M1, Da) > (M2, Dd) > (M1, De) > (M2, Df) |
| 5 | (M1, Da) > (M2, Dd) > (M1, Db) > (M2, Df) > (M1, De) > (M2, Dc) |
| 6 | (M2, Dc) > (M1, Da) > (M2, Dd) > (M1, Db) > (M2, Df) > (M1, De) |

In an embodiment, application of designer specified constraints reduces the set of feasible walk sequences obtained by the DFS of the node-edge graph. For example, a designer constraint that $D_f$ must end the overall sequence, i.e., be the showstopper, eliminates all walk sequences except numbers 1 and 4. Alternatively a designer constraint that design themes $D_a$-$D_c$ and $D_d$-$D_f$, be presented apart from each other eliminates presentation sequences 5 and 6. Other designer stipulations and constraints may be used to reduce the set of feasible presentation sequences.

In an embodiment, a presentation-scoring AI model scores each remaining feasible presentation sequences and enables a ranking of the set of feasible presentation sequences from best to worst according to the determined score.

As an example, training an AI scoring model includes the use of a training data set where the training data set includes model/design pairings together with reviews of the pairings. In an embodiment, the method parses video of model/design pairing sequences, annotating the video of individual pairings with associated review text. In this embodiment, the method then extracts the annotated pairing video and provides the extracted portions to an embedding space. The method provides the embedded data to an AI model—such as a bi-directional long-short-term memory (bi-LSTM) neural network. Training the model includes a bi-LSTM regression process, adjusting the bi-LSTM neural network node weights to achieve the original review score for the embedded model/design sequences. In this embodiment, the trained AI scoring model then receives and scores potential presentation sequences using the trained bi-LSTM model.

As an example, a presentation coordinator predetermines a soundtrack component for respective portions, or design themes, of the planned presentation. In an embodiment, a choreographer selects background music for each fashion design theme. In this embodiment, the AI pairing model considers the soundtrack data as an input in addition to the model and design attributes. The AI pairing model considers the relative presentation timings for each possible model/design pairing, as well as the overall timing of the soundtrack and the beats per minute of the music. In this embodiment, the AI pairing model considers design elements and model attributes which may affect presentation pace and timing, model gait attributes and design elements which may enhance or impede the pace of design presentations—design length or complexity. In this embodiment, the AI pairing model alters the set of possible walk sequences, eliminating those sequences which are not possible after considering the selected soundtrack.

In an embodiment, the presentation coordinator specifies a presentation model sequence, but does not specify model/design pairings, presentation timing, or theme soundtracks. In this embodiment, the AI pairing model determines model/design pairings using a first trained bi-LSTM neural network. The method provides the pairings as input to two bi-LSTM networks. One bi-LSTM network combines pairing sequences with background music to identify optimal sequence music combinations, and another bi-LSTM network AI scoring model determines overall scores for potential model/design pairing sequence music combinations. The AI music selection model considers potential soundtracks as well as presentation timings associated with each potential model design paring sequences in arriving at a final best overall presentation model/design soundtrack combination having the highest overall scoring. In this embodiment, the method utilizes a twin neural network in training the bi-LSTM music selection network and bi-LSTM sequence scoring network to concurrently evaluate and determine the best soundtrack for each theme, the best presentation timing for the pairings of each theme and the best overall set of pairings and pairing sequences for the overall set of design themes.

In an embodiment, the presentation-scoring AI model includes a regression model trained using detailed critical descriptions of presentation sequences including identical or similar presentation models and fashion designs described by the same set of attributes together with the rankings associated with the described previous presentation sequences. Natural language processing of the previous detailed descriptions, similar to sentiment analysis and considering both positive and negative details of previous presentation sequences, train the current presentation-sequence-scoring AI regression model in preparation for analyzing and scoring feasible presentation sequences from the graph of FIG. 3. In an embodiment, the presentation sequence scoring regression AI model performs similarly to a sentiment scoring NLP model. The method compiles a textual description of each feasible presentation sequence and passes that description to the presentation-sequence-scoring regression AI model. The AI scoring model takes in the textual description and returns a score similar to a sentiment score in sentiment analysis.

In an embodiment, the method ranks the set of feasible presentation sequences according to the corresponding set of presentation sequence scores returned from the presentation-sequence-scoring AI model. In this embodiment, the method presents the presentation sequence having the highest presentation-sequence score as the optimal or best presentation model/design pairing presentation sequence available for the given set of presentation model and fashion design inputs.

Figure 4:
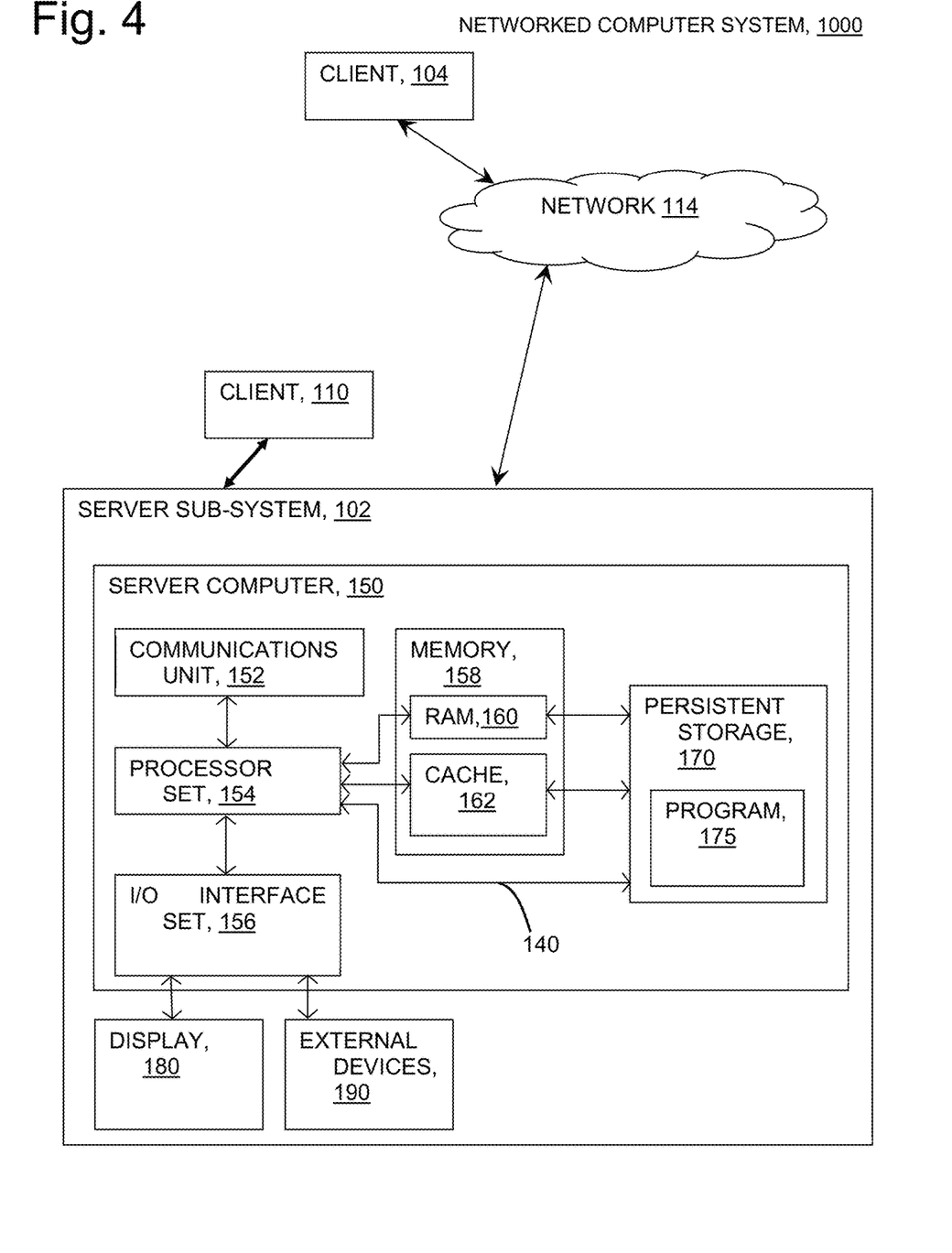
FIG. 4 provides a schematic illustration of a system, according to an embodiment of the invention.

FIG. 4 provides a schematic illustration of exemplary network resources associated with practicing the disclosed inventions. The inventions may be practiced in the processors of any of the disclosed elements which process an instruction stream. As shown in the figure, a networked Client device 110 connects wirelessly to server sub-system 102. Client device 104 connects wirelessly to server sub-system 102 via network 114. Client devices 104 and 110 comprise presentation-sequencing application program (not shown) together with sufficient computing resource (processor, memory, network communications hardware) to execute the program. As shown in FIG. 4, server sub-system 102 comprises a server computer 150. FIG. 4 depicts a block diagram of components of server computer 150 within a networked computer system 1000, in accordance with an embodiment of the present invention. It should be appreciated that FIG. 4 provides only an illustration of one implementation and does not imply any limitations with regard to the environments in which different embodiments can be implemented. Many modifications to the depicted environment can be made.

Server computer 150 can include processor(s) 154, memory 158, persistent storage 170, communications unit 152, input/output (I/O) interface(s) 156 and communications fabric 140. Communications fabric 140 provides communications between cache 162, memory 158, persistent storage 170, communications unit 152, and input/output (I/O) interface(s) 156. Communications fabric 140 can be implemented with any architecture designed for passing data and/or control information between processors (such as microprocessors, communications and network processors, etc.), system memory, peripheral devices, and any other hardware components within a system. For example, communications fabric 140 can be implemented with one or more buses.

Memory 158 and persistent storage 170 are computer readable storage media. In this embodiment, memory 158 includes random access memory (RAM) 160. In general, memory 158 can include any suitable volatile or non-volatile computer readable storage media. Cache 162 is a fast memory that enhances the performance of processor(s) 154 by holding recently accessed data, and data near recently accessed data, from memory 158.

Program instructions and data used to practice embodiments of the present invention, e.g., the visual element sequencing program 175, are stored in persistent storage 170 for execution and/or access by one or more of the respective processor(s) 154 of server computer 150 via cache 162. In this embodiment, persistent storage 170 includes a magnetic hard disk drive. Alternatively, or in addition to a magnetic hard disk drive, persistent storage 170 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 170 may also be removable. For example, a removable hard drive may be used for persistent storage 170. Other examples include optical and magnetic disks, thumb drives, and smart cards that are inserted into a drive for transfer onto another computer readable storage medium that is also part of persistent storage 170.

Communications unit 152, in these examples, provides for communications with other data processing systems or devices, including resources of client computing devices 104, and 110. In these examples, communications unit 152 includes one or more network interface cards. Communications unit 152 may provide communications through the use of either or both physical and wireless communications links. Software distribution programs, and other programs and data used for implementation of the present invention, may be downloaded to persistent storage 170 of server computer 150 through communications unit 152.

I/O interface(s) 156 allows for input and output of data with other devices that may be connected to server computer 150. For example, I/O interface(s) 156 may provide a connection to external device(s) 190 such as a keyboard, a keypad, a touch screen, a microphone, a digital camera, and/or some other suitable input device. External device(s) 190 can also include portable computer readable storage media such as, for example, thumb drives, portable optical or magnetic disks, and memory cards. Software and data used to practice embodiments of the present invention, e.g., visual element sequencing program 175 on server computer 150, can be stored on such portable computer readable storage media and can be loaded onto persistent storage 170 via I/O interface(s) 156. I/O interface(s) 156 also connect to a display 180.

Display 180 provides a mechanism to display data to a user and may be, for example, a computer monitor. Display 180 can also function as a touch screen, such as a display of a tablet computer.

Figure 5:
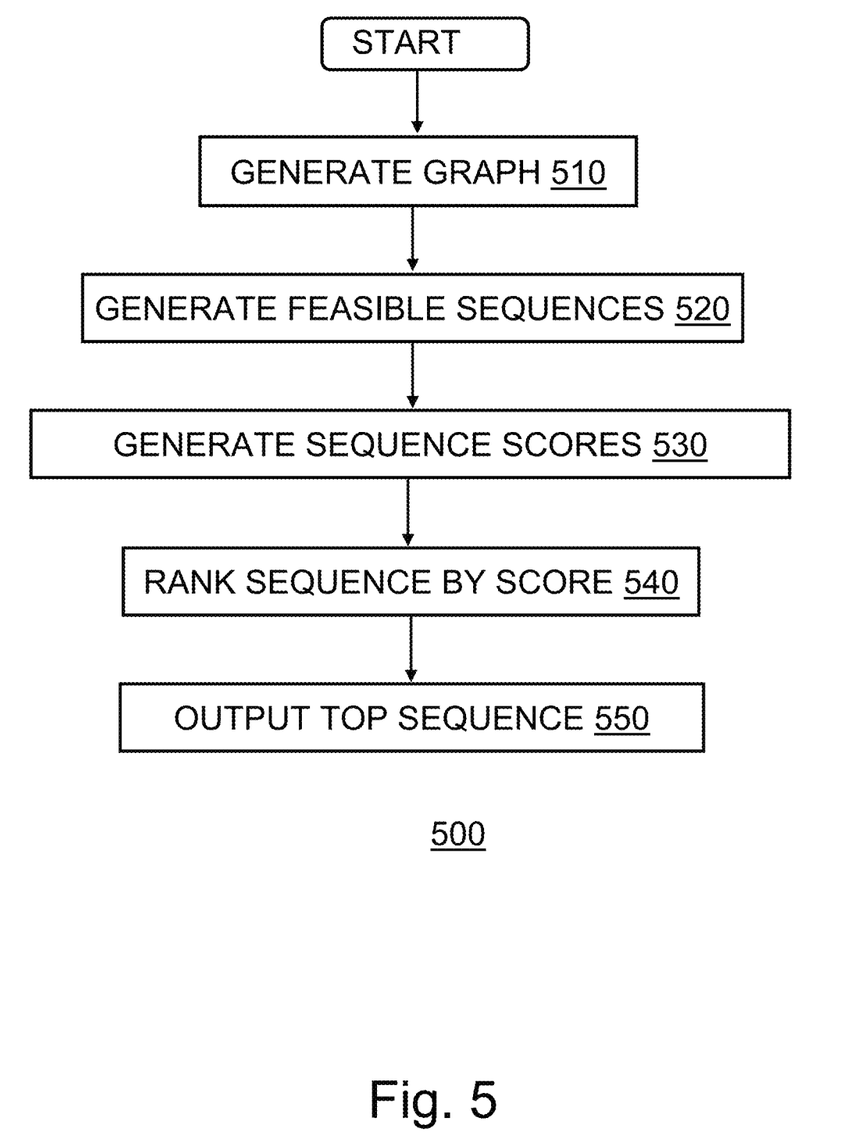
FIG. 5 provides a flowchart depicting operational steps, according to an embodiment of the invention.

Flowchart 500 of FIG. 5 depicts operational steps associated with methods according to an embodiment of the invention. As shown in the figure at block 510, the method of visual element sequencing program 175 generates or creates a graph of defined compound visual elements such as presentation model/fashion design pairing. In an embodiment, the method generates a node—edge model where each compound visual element constitutes a model node and each edge represents a sequence step between nodes.

At block 520, a DFS of the graph yields a set of all feasible sequences for the set of nodes. In an embodiment, the DFS includes one or more sequencing constraints and formation of sequence stacks includes validating that the stack continues to comply with all sequencing constraints with the addition of each new sequence node.

At block 530 a presentation sequence scoring AI model provides a presentation sequence score for each feasible presentation sequence. Training the presentation sequence scoring model includes evaluating a training data set with historical presentation sequence descriptions, criticisms and rankings.

At block 540, the method of the presentation-sequencing program ranks the set of scored presentation sequences from highest score to lowest and at block 550 the presentation sequencing method provides the highest-ranking presentation sequence as an output to a user of the method.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
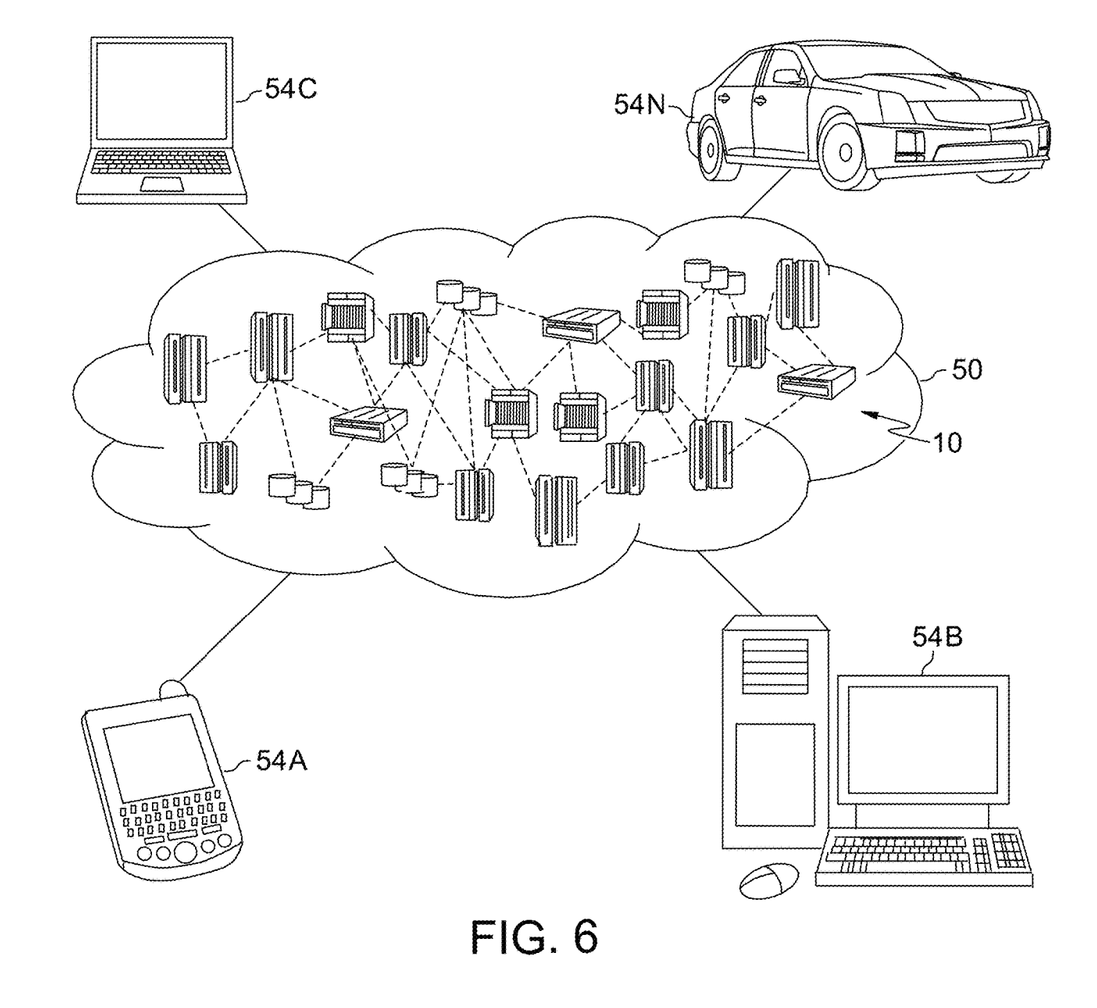
FIG. 6 depicts a cloud computing environment, according to an embodiment of the invention.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
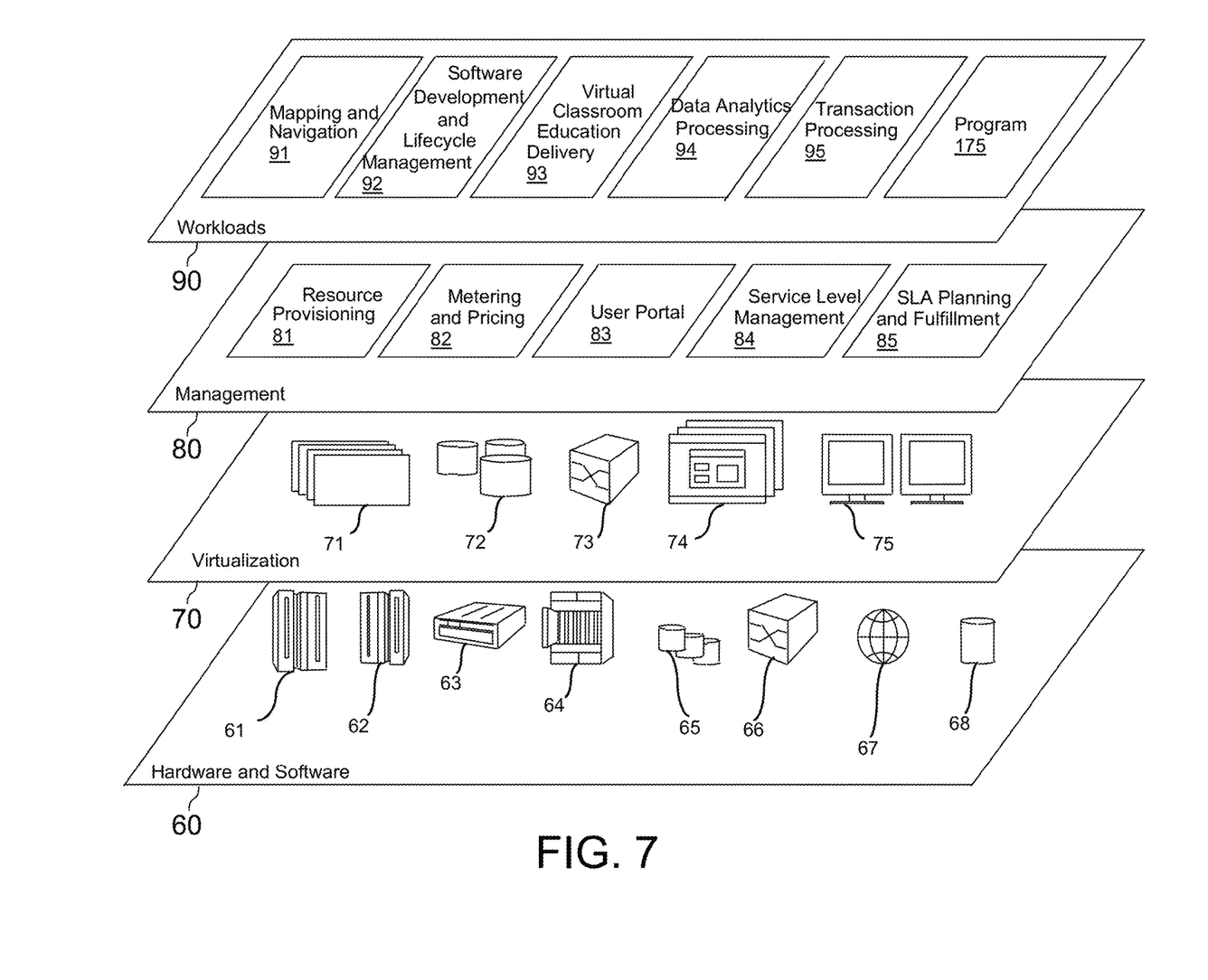
FIG. 7 depicts abstraction model layers, according to an embodiment of the invention.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and visual element sequencing program 175.

The present invention may be a system, a method, and/or a computer program product at any possible technical detail level of integration. The invention may be beneficially practiced in any system, single or parallel, which processes an instruction stream. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer implemented method for managing visual element composition and presentation sequencing for compound visual elements, the method comprising:
    generating, by one or more computer processors, a node-edge graph of compound visual element combinations, each combination comprising a presentation model and a fashion design;
    generating, by the one or more computer processors, a set of possible visual element presentation sequences of compound visual element combinations, each combination comprising a presentation model and a fashion design according to a depth-first search (DFS) of the graph;
    generating, by the one or more computer processors, a visual element presentation sequence score for each visual element presentation sequence of the set of possible visual element presentation sequences according to visual element attributes; and
    enumerating, by the one or more computer processors, a visual element presentation sequence according to a visual element presentation sequence score.

2. The computer implemented method according to claim 1, further comprising generating a score for each possible compound visual element combination.

3. The computer implemented method according to claim 2, further comprising generating a score for each possible compound visual element combination according to attributes associated with each possible element of the compound visual element.

4. The computer implemented method according to claim 1, further comprising reducing the set of possible visual element presentation sequences according to a defined presentation constraint.

5. The computer implemented method according to claim 4, wherein the defined presentation constraint comprises an end of sequence constraint.

6. The computer implemented method according to claim 1, wherein generating the set of possible visual element presentation sequences according to a depth-first search (DFS) of the graph comprises:
    forming a stack of nodes for each possible presentation; and
    considering all nodes outside the stack for inclusion in the stack.

7. The computer implemented method according to claim 1, wherein the compound visual elements comprise a combination of a presentation model and a visual design.

8. A computer program product for managing visual element composition and presentation sequencing for compound visual elements, the computer program product comprising one or more computer readable storage devices and program instructions collectively stored on the one or more computer readable storage devices, the stored program instructions comprising:
    program instructions to generate a node-edge graph of compound visual element combinations, each combination comprising a presentation model and a fashion design;

program instructions to generate a set of possible visual element presentation sequences of compound visual element combinations, each combination comprising a presentation model and a fashion design according to a depth-first search (DFS) of the graph;

program instructions to generate a visual element presentation sequence score for each visual element presentation sequence of the set of possible visual element presentation sequences according to visual element attributes; and program instructions to enumerate a visual element presentation sequence according to a visual element presentation sequence score.

9. The computer program product according to claim 8, the stored program instructions further comprising program instructions to generate a score for each possible compound visual element combination.

10. The computer program product according to claim 9, the stored program instructions further comprising program instructions to generate a score for each possible compound visual element combination according to attributes associated with each possible element of the compound visual element.

11. The computer program product according to claim 8, the stored program instructions further comprising program instructions to reduce the set of possible visual element presentation sequences according to a defined presentation constraint.

12. The computer program product according to claim 11, wherein the defined presentation constraint comprises an end of sequence constraint.

13. The computer program product according to claim 8, wherein program instructions to generate the set of possible visual element presentation sequences according to a depth-first search (DFS) of the graph comprises:
program instructions to form a stack of nodes for each possible presentation; and
program instructions to consider all nodes outside the stack for inclusion in the stack.

14. The computer program product according to claim 8, wherein the compound visual elements comprise a combination of a presentation model and a visual design.

15. A computer system for managing visual element composition and presentation sequencing for compound visual elements, the computer system comprising:
one or more computer processors;
one or more computer readable storage devices; and
stored program instructions on the one or more computer readable storage devices for execution by the one or more computer processors, the stored program instructions comprising:
program instructions to generate a node-edge graph of compound visual element combinations, each combination comprising a presentation model and a fashion design;
program instructions to generate a set of possible visual element presentation sequences of compound visual element combinations, each combination comprising a presentation model and a fashion design according to a depth-first search (DFS) of the graph;
program instructions to generate a visual element presentation sequence score for each visual element presentation sequence of the set of possible visual element presentation sequences according to visual element attributes; and
program instructions to enumerate a visual element presentation sequence according to a visual element presentation sequence score.

16. The computer system according to claim 15, the stored program instructions further comprising program instructions to generate a score for each possible compound visual element combination.

17. The computer system according to claim 16, the stored program instructions further comprising program instructions to generate a score for each possible compound visual element combination according to attributes associated with each possible element of the compound visual element.

18. The computer system according to claim 15, the stored program instructions further comprising program instructions to reduce the set of possible visual element presentation sequences according to a defined presentation constraint.

19. The computer system according to claim 15, wherein the program instructions to generate the set of possible visual element presentation sequences according to a depth-first search (DFS) of the graph comprise:
program instructions to form a stack of nodes for each possible presentation; and
program instructions to consider all nodes outside the stack for inclusion in the stack.

20. The computer system according to claim 15, wherein the compound visual elements comprise a combination of a presentation model and a visual design.

\* \* \* \* \*